United States Patent [19]

Eckler et al.

[11] Patent Number: 4,758,281

[45] Date of Patent: Jul. 19, 1988

[54] ANTI-CORROSIVE PROTECTIVE COATINGS

[75] Inventors: Paul E. Eckler; Louis W. Ferrara; Larry A. Fellows, all of Terre Haute, Ind.

[73] Assignee: International Minerals & Chemical Corp., Terre Haute, Ind.

[21] Appl. No.: 906,427

[22] Filed: Sep. 12, 1986

[51] Int. Cl.$^4$ .......................... C08K 3/22; C08K 3/32; C08K 3/36

[52] U.S. Cl. .............................. 106/467 A; 106/14.12; 106/287.17; 106/287.34; 106/401; 106/482; 423/311; 423/327

[58] Field of Search ............... 106/287.34, 308 B, 309, 106/14.05; 423/309, 311, 327; 106/288 B, 287.17, 14.12

[56] References Cited

U.S. PATENT DOCUMENTS

| | | | |
|---|---|---|---|
| 3,801,704 | 4/1974 | Kobayashi et al. | 423/309 |
| 3,870,737 | 3/1975 | Birchall et al. | 252/74 |
| 3,943,231 | 3/1976 | Wasel-Nielen et al. | 423/311 |
| 3,960,592 | 6/1976 | Birchall et al. | 252/74 |
| 4,005,172 | 1/1977 | Birchall et al. | 423/305 |
| 4,147,758 | 4/1979 | Adrian et al. | 423/315 |
| 4,418,048 | 11/1983 | Dyer et al. | 423/305 |

FOREIGN PATENT DOCUMENTS

| | | |
|---|---|---|
| 60-38471 | 2/1985 | Japan . |
| 2071070 | 7/1981 | United Kingdom . |

OTHER PUBLICATIONS

Derwent Abstract Accession No. 79-361 25B/19, Japanese patent, No. J54041923, Apr. 3, 1979.

Nishihara, M., et al., *Polym. Paint Col. J.*, 1984, vol. 174, No. 4125. 590.

E. L. Neu et al., Concise Encyclopedia of Chem. Tech., 351-352 (1985).

D. W. Breck et al., ibid, 772-774.

B. P. F. Goldie, Novel Corrosion Inhibitors, Paint and Resin. Feb. 1985(cf ref.AM).

*Primary Examiner*—Amelia Burgess Yarbrough
*Attorney, Agent, or Firm*—Robert H. Dewey; Thomas L. Farquer

[57] ABSTRACT

An anti-corrosion coating and pigment therefore, the latter comprising the combination of condensed aluminum phosphate with a comminuted zeolite or silica and process for the preparation thereof.

20 Claims, No Drawings

ANTI-CORROSIVE PROTECTIVE COATINGS

BACKGROUND OF THE INVENTION

This invention relates to anti-corrosion protective coatings. In a particular aspect this invention relates to corrosion-inhibiting pigments for protective coatings.

Metal objects in general, and steel or iron objects in particular, are usually protected from corrosion by a protective coating, preferably one containing a corrosion inhibiting pigment. Previously, pigments such as red lead, zinc chromate, zinc phosphate, barium metaborate, and zinc dust have been used. More recently, aluminum metaphosphate (B-type) in the presence of an alkaline earth compound and/or a zinc compound was disclosed by the Teikoku Kako Co., Japanese Patent Application No. 60-38471 (CA102:222232R) and "calcium exchanged silica" was disclosed by British Petroleum Co., British Patent No. 2,071,070B. Recently aluminum triphosphate was proposed (Nishihara, M., et al. *Polym. Paint Col. J*, 1984 Vol. 174, No. 4125. 590).

It is an object of this invention to provide anti-corrosion protective coatings.

It is another object of this invention to provide corrosion-inhibiting pigments.

It is still another object of this invention to provide a process for the production of the corrosion-inhibiting pigments.

It is still yet another object of this invention to provide metal articles coated with the protective coating of this invention.

Other objects of this invention will be apparent to those skilled in the art from the disclosure herein.

SUMMARY OF THE INVENTION

It is the discovery of this invention to provide a corrosion-inhibiting pigment comprising a combination of a condensed aluminum phosphate with a comminuted zeolite or silica and process for the preparation thereof. It is also an embodiment of this invention to provide protective coatings containing the corrosion inhibiting pigments and metal articles coated with the coating.

DETAILED DESCRIPTION

The pigments of this invention comprise a condensed aluminum phosphate such as aluminum dihydrogen tripolyphosphate (hereinafter referred to as APP) in combination with a comminuted zeolite or silica; or the condensed aluminum phosphate can be glassy aluminum phosphate (an amorphous, condensed aluminum phosphate). The pigment is not a simple mixture but rather the condensed aluminum phosphate is prepared in the presence of the zeolite or silica. The mixture is believed to be a physical one wherein the zeolite or silica is a carrier for the condensed aluminum phosphate, rather than a chemical combination. It is further believed that the comminuted zeolite or silica particles are coated with the aluminum phosphate.

Zeolites are very well known. Primarily alumino silicates of sodium, potassium, magnesium or calcium, they occur both naturally and synthetically and with considerable variation in the Al:Si ratio. They can be represented by the formula $M_{2/n}O \cdot Al_2O_3 \cdot ySiO_2 \cdot wH_2O$ where y is 2 or greater, n is the cation valence and w is the water contained in the voids of the zeolite. Any of the known zeolites may be used in the practice of this invention. Preferred ones are the naturally occurring ones, especially mordonite and clinoptilolite. The latter is particularly preferred. For further discussion of zeolites, there can be mentioned the article "Molecular Sieves" by D. W. Breck and R. A. Anderson in the Concise Encyclopedia of Chemical Technology, pp 772-774, Kirk-Othmer (1985).

The comminuted silica can be provided by, e.g., diatomaceous earth or condensed silica fumes. Diatomaceous earth is a very well-known, finely divided, naturally occurring source of silica with minor amounts of other substances. It is described, e.g., by E. L. Neu and A. F. Alciatore, Concise Encyclopedia of Chemical Technology, Ibid., pp. 351-352. Other forms of finely divided silica are also suitable. One such form is condensed silica fumes from ferro silicon production. Diatomaceous earth is the preferred source of silica.

According to the process for preparing the pigment of this invention where the condensed aluminum phosphate is APP, an aluminum source, such as aluminum hydroxide, is first reacted with a phosphorous-containing acid, e.g. orthophosphoric acid (85%), in a ratio of about 1:3.5-4.5 respectively, preferably about 1:4, while removing water. The reaction mixture is heated, and when it reaches 105°-110° C., the zeolite or silica is added. The amount of zeolite or silica is not critical but generally it can vary from about 1.0 to 1.5 parts per part of the weight of the aluminum hydroxide, preferably about 1.25. The mixture is further heated to within about 120° to 150° C. until the water content is about 23-27%, preferably about 25%. At this time the product is very viscous, i.e. of a pasty consistency. It is allowed to cool whereupon it solidifies and is then broken or comminuted. The product at this stage has not been characterized or identified.

The product of the above process is now subjected to further heating at about 275°-325° C., preferably about 300° C. for from 4-6 hours, preferably about 5 hours. When the desired product is APP, the heating at 300° C. is done under pressure, e.g. under sealed conditions, to prevent further dehydration. It is then cooled, comminuted and is ready for use as a pigment. When a zeolite is used, the product is identified by X-ray powder diffraction method as a layer of aluminum dihydrogen tripolyphosphate on the surface of the zeolite which is otherwise unchanged.

The product prepared from silica instead of zeolite is prepared by essentially the same process. However, the composition has not been determined.

The aluminum source used in the practice of this invention can be any aluminum compound which is reactable with the phosphorous-containing acid. Such aluminum compounds include most of the salts except the alumino-silicates. However, aluminum hydroxide (or its anhydride, aluminum oxide) is preferred.

The phosphorous containing acid can be provided by ortho-phosphoric acid, which is preferred, pyrophosphoric acid or polyphosphoric acid. Monoaluminum phosphate, which is an article of commerce, is also suitable.

A particularly preferred pigment is the embodiment wherein the condensed aluminum phosphate is a glassy aluminum phosphate. This product is prepared by reacting an aluminum source, e.g. aluminum hydroxide (or oxide), with ortho-phosphoric acid, much as described above, except that the zeolite isn't added until the temperature is about 120° and the amount of zeolite added is about 3.5-4.0 parts per part (by weight) of aluminum hydroxide, preferably about 3.75. The heating period is continued until the water content is about 15–20% instead of 23–27%. Glassy aluminum phosphate may be prepared under sealed conditions, as described above but no advantage to doing so has been observed. After cooling and comminuting, the product is heated at about 300° for 4–6 hours. The final product contains no aluminum dihydrogen tripolyphosphate as determined by X-ray powder diffraction; it does not correspond to any product described in the literature.

Accordingly, it is an embodiment of this invention to provide a process for the production of a corrosion-inhibiting pigment wherein a particle of comminuted zeolite is coated with a condensed, glassy aluminum phosphate comprising the steps of:

(a) reacting an aluminum source selected from the group consisting of a salt of aluminum with an inorganic mineral acid such as the chloride, the sulfate, etc., aluminum hydroxide or aluminum oxide with a phosphorous-containing acid selected from the group consisting of ortho phosphoric acid, pyrophosphoric acid, polyphosphoric acid or monoaluminum phosphate in a mole ratio of about 3:1 of P:Al, (b) adding a comminuted zeolite in an amount sufficient to provide a ratio of Si:P of about 1:1, (c) heating under water-removing conditions to about 120° C., (d) continuing heating at about 120° until the water content is within about 15–20%, (e) continuing heating at about 300° C. for a length of time sufficient to effect a glassy condensed aluminum phosphate coating on zeolite.

The corrosion-inhibiting pigment of the present invention can be used with any protective coating, many of which are known, such as those based on alkyd resins or drying oils, e.g. paints, varnishes, lacquers, waterborne coatings, etc. The pigment of this invention can be merely substituted on a weight basis for a previously employed pigment, but preferably the amount is determined by the relative bulking values of the pigment, inasmuch as volume rather than weight of pigment determines the covering effectiveness. The protective coating itself, minus the corrosion-inhibiting pigment, forms no part of the invention-only the combination of the coating and the pigment.

The invention will be better understood with reference to the following examples. It is understood, however, that the examples are intended only to illustrate the invention. It is not intended that the invention be limited thereby.

EXAMPLE 1

A sample of 50 mesh zeolite from the Rocky Mountain Energy deposits, analyzed as follows: 27.8% Si, 6.48% Al, 2.94% Na, 11.7% $H_2O$. This sample was used in this experiment and those of Examples 1–4.

Aluminum hydroxide 84 g (1.077 moles) and 85% phosphoric acid 492 g (4.267 moles) were mixed in a reaction vessel equipped with a heating means, a stirring means, and a distillation means for removal of water. The mixture was gradually heated with stirring at 120° C. to 150° C. while removing water, during which time viscosity increased rapidly. Zeolite 103 g, was added when the temperature reached about 108° C., before the viscosity became too high to permit good pigment wetting. When stirring became difficult the mixture was transferred to a stainless steel pan and heating was continued in an oven at about 120° C. until the product had solidified. The water content was 25.15%, as determined by loss of weight by heating at a rate of 10° C./min. to a temperature of 500° C. and maintaining that temperature for 30 minutes. The product; unidentified, was a slightly brownish, off-white solid which was noticeably hygroscopic on standing in humid air.

The product 397 g, was divided into 8 portions. Each portion was transferred to a porcelain dish and placed in a sealed tube provided by a stainless steel pipe, 6" in diameter and 11" long. One end was plugged and the other was threaded to allow closure with a pipe cap. A small valve was installed on the side to vent steam if necessary. The final assembly was vapor-tight. Each portion was heated at 300° C. in a forced air oven for five hours and the resulting products were pooled; total yield, 329 g. Analysis by X-ray powder diffraction showed aluminum dihydrogen tripolyphosphate dihydrate (APP). The P:Al ratio in the charge was 4:1 and the Si:P ratio was 1:4. The product was ground in a shatterbox mill for use in paint studies. It was an off-white, grayish powder. (Sample 49).

EXAMPLE 2

The APP prepared as per Example 1 was used in a commercial-type paint formula. The resin was an epoxy-modified amino resin crosslinked baking polyester (Dynapol L-205) intended as a coil coating primer for use on steel articles such as siding and building panels.

A resin solution was prepared by dissolving 300 parts by weight of the above resin in a solvent consisting of 420 parts by weight of aromatic hydrocarbon and 280 parts of ethoxyethyl acetate.

The following formula was used:

| Resin solution | 400 parts wt. |
| Ethoxyethyl acetate | 52 |
| Silica | 3 |
| Mica. | 15 |
| Anti-Corrosive Pigment | 75 |
| Titanium dioxide | 55 |

The above ingredients were ground in a ball mill to Hegman 6+, then the following was added:

| Resin solution | 330 |
| Amino resin* | 50 |
| Epoxy resin** | 20 |

*Cymel 325, American Cyanamid Corp.
**Epon 828, Shell Chemical Corp.

A paint prepared by the above formula was used for testing the APP-zeolite combination as an anti-corrosive pigment. As a control a similar formulation was prepared using K White #82 (a commercial pigment of APP, diatomaceous earth and zinc oxide) as the anti-corrosive pigment. The two paints were applied to 4"×12" Bonderite 1000 panels using a No. 66 wine-wound rod as an applicator. The panels were baked at 350° F. for 30 secs. with less than 2 min. prior flash time. The dry film thickness was 1.1–1.2 mils. Properties of the films are given in Table 1. The anti-corrosive properties were tested by the method of ASTM B-117. The anti-corrosive properties of APP on zeolite were equal to or better than those of the control.

TABLE 1

| Paint and Film Properties | Control | Ex. 2 | Ex. 4 |
|---|---|---|---|
| Viscosity, Stormer, KU, | | | |
| initial | 84 | 102 | 97 |
| After 4 weeks at 120° F. | 110 | 103 | 123 |
| Film properties | | | |
| Pencil Hardness | 3–4H | 4–5H | 4H |
| Reverse Impact | 50 | 60–70 | 60–70 |
| Crosshatch Adhesion | 100 | 100 | 100 |
| Gloss, 60° | 20–25 | 3 | 9–10 |
| 20° | 4 | 1 | 2 |

EXAMPLE 3

Into a reaction vessel equipped with a heating means and a stirring means, there was delivered 369 g phosphoric acid (4.021 moles) and 84 g aluminum hydroxide (1.077 moles). The mixture was heated to 120° C. and 316 g of zeolite was added slowly. The mixture became too pasty to stir so it was transferred to a pan and dried in a forced air oven at 120° C. for 1 hour. After cooling, the product was ground to yield 633 g of free flowing, light green powder having a water content of 17.74%. The P:Al ratio of the charge was 3:1 and the Si:P ratio was 1:1.

Two portions of about 58 g each of the above products were separately placed in a sealed tube as described in Example 1 and heated at 300° C. for five hours. The yield from 116 g of starting material was 100 g of free flowing product. When analyzed by x-ray powder diffraction, no aluminum dihydrogen tripolyphosphate was found but a minor amount of aluminum orthophosphate ($AlPO_4$) was detected. It was concluded that the product was a glassy aluminum phosphate on zeolite.

EXAMPLE 4

The product of Example 3 was ground in a shatterbox mill and was used in the preparation of a paint as described in Example 2. The paint was applied to steel panels as described in Example 2 and was tested for anti-corrosion properties. Properties of the film are given in Table 1. The anti-corrosion properties were excellent—even better than the APP of Example 1.

EXAMPLE 5

Diatomaceous earth 50 g was mixed with 50% monoaluminum phosphate 138 g to form a paste. The paste was transferred to a calciner and was heated rapidly with agitation to 375°–450° C. and heating was continued for 1 hour, after which the calciner and contents were then rapidly cooled to ambient temperature. The product was then ground to a fine, grey free-flowing powder, yield 84.9 g. X-ray crystallography showed the material to be a mixture of $AlPO_4$ and diatomaceous earth.

EXAMPLE 6

The experiment of example 2 is repeated in all essential details except that the product of example 5 is substituted for the product of example 1 as the corrosion inhibitor. The product of example 5 is shown to be an excellent corrosion-inhibiting pigment.

We claim:

1. A corrosion inhibiting pigment produced by the process comprising the steps of
   (a) heating an aluminum source selected from the group consisting of aluminum hydroxide, aluminum oxide, and aluminum sulfate, with a phosphorous-containing compound selected from the group consisting of orthophosphoric acid, pyrophosphoric acid, polyphosphoric acid and monoaluminum phosphate in a ratio of about 1:3.5–4.5 under water-removing conditions to a temperature within the range 105°–110° C.
   (b) adding a zeolite or silica in an amount of about 1.0 to 15 parts per part of the aluminum source,
   (c) heating to within about 120° to about 150° C. until the water content is within about 23–27%,
   (d) cooling the product thereby obtained to produce a solid,
   (e) communicating the product,
   (f) heating the communicated product to within about 275°–325° C. for from 4 to 6 hours under sealed conditions
   (g) cooling the product and comminuting same thereby producing the pigment.
2. The pigment of claim 1 consisting essentially of the combination of a zeolite coated with aluminum dihydrogen tripolyphosphate.
3. The pigment of claim 1 consisting essentially of the combination of condensed aluminum phosphate with silica.
4. The pigment of claim 3 wherein the silica is provided by diatomaceous earth.
5. The pigment of claim 3 wherein the silica is provided by condensed silica fumes.
6. The pigment of claim 2 wherein the zeolite is clinoptilolite.
7. A process for the production of a corrosion-inhibiting pigment wherein a particle of comminuted zeolite is coated with a condensed, glassy aluminum phosphate comprising the steps of:
   (a) reacting an aluminum source selected from the group consisting of aluminum sulfate, aluminum hydroxide or aluminum oxide with a phosphorous-containing acid selected from the group consisting of orthophosphoric acid, pyrophosphoric acid, polyphosphoric acid or monoaluminum phosphate in a mole ratio of about 3:1 of P:Al,
   (b) heating under water-removing conditions to about 120° C.,
   (c) adding a comminuted zeolite in an amount sufficient to provide a ratio of Si:P of about 1:1,
   (d) continuing heating at about 120° until the water content is within about 15–20%,
   (e) continuing heating at about 300° C. for a length of time sufficient to effect a glassy condensed aluminum phosphate coating on zeolite.
8. The pigment of claim 1 wherein the phosphorous-containing acid is orthophosphoric acid.
9. The process of claim 7 wherein the phosphorous-containing acid is orthophosphoric acid.
10. The process of claim 7 wherein the phosphorous-containing acid is pyrophosphoric acid.
11. The process of claim 7 wherein the phosphorous-containing acid is polyphosphoric acid.
12. The process of claim 7 wherein the phosphorous-containing acid is monoaluminum phosphate.
13. The process of claim 7 wherein the aluminum source is aluminum hydroxide.
14. The process of claim 7 wherein the aluminum source is aluminum oxide.
15. The process of claim 7 wherein the aluminum source is an aluminum salt of an inorganic acid.

16. The pigment of claim 1 wherein the zeolite is mordonite or clinoptilolite.

17. The pigment of claim 1 wherein the aluminum soure is aluminum hydroxide.

18. The pigment of claim 1 wherein the aluminum source is aluminum oxide.

19. The pigment of claim 1 wherein the aluminum source is aluminum sulfate.

20. The pigment of claim 1 wherein silica is added to the aluminum source in step (b).

* * * * *